(No Model.)
E. F. SHERMAN, Dec'd.
C. M. Sherman, Executrix.
HARROW.
No. 396,374. Patented Jan. 15, 1889.
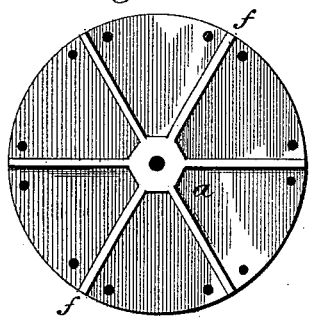
Fig. 1.
Fig. 2.
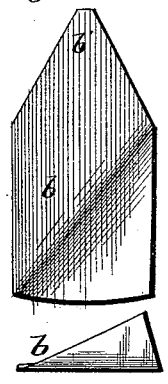
Fig. 3. Fig. 4.
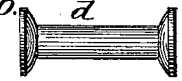
Fig. 6. Fig. 5.
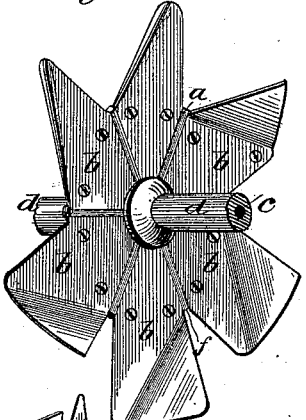
Fig. 7.
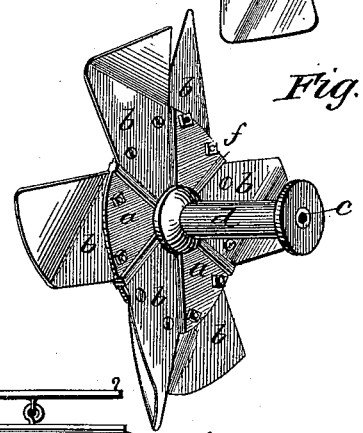
Fig. 8.
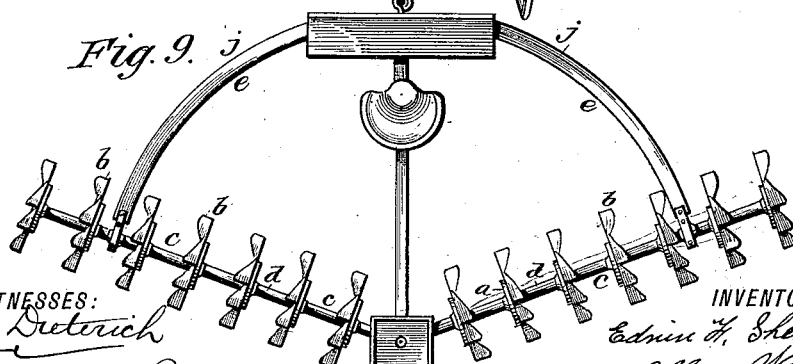
Fig. 9.
WITNESSES:
Fred G. Dieterich
Frank W. Lee
INVENTOR,
Edwin F. Sherman
BY Allen Webster
ATTORNEY.

UNITED STATES PATENT OFFICE.

EDWIN F. SHERMAN, OF SPRINGFIELD, MASSACHUSETTS; CAROLINE M. SHERMAN EXECUTRIX OF SAID EDWIN F. SHERMAN, DECEASED.

HARROW.

SPECIFICATION forming part of Letters Patent No. 396,374, dated January 15, 1889.

Application filed January 5, 1888. Serial No. 259,901. (No model.)

*To all whom it may concern:*

Be it known that I, EDWIN F. SHERMAN, a citizen of the United States of America, residing in Springfield, Hampden county, Massachusetts, have invented new and useful Improvements in Harrows, of which the following is a specification, reference being had to the accompanying drawings and letters of reference marked thereon.

My invention relates to a class of harrows known as "revolving-disk" or "revolving-tooth" harrows.

The construction heretofore of such harrows has been defective in various respects. In some the teeth or blades or stirrers have not been removable, so that a wearing or breaking of one tooth or blade has rendered the whole plate or piece worthless for effective working. With others the teeth or blades have been made removable; but the manner of attaching the same to the central plate has been such that the teeth or blades could not be readily and securely fastened in position, and the strain when in operation has been against the fastening-bolts, thus necessitating the use of large and strong bolts to hold the parts together; and with harrows of this class heretofore no provision has been made, to my knowledge, whereby the teeth or blades could be interchanged and the harrow thus rendered effectively operative for different kinds of work, and heretofore the shape of the blades or teeth has been such that in use the earth has been thrust sidewise, rather than lifted and stirred.

The object of my invention is to provide a device which shall be free from the above-stated as well as other well-known objectionable features, and to construct a device which, while being of simple construction, will give the best attainable results in operation, and, generally, to provide a device which has the advantages as herein more specifically referred to; and to that end my invention consists in providing a central plate or disk with ribs or recesses to relieve the bolts from strain, in the manner of holding the inner ends of the blades or teeth in position, in the angular bend given to the blade, in the arrangement whereby the teeth or blades may be interchanged and the operative features of the harrow increased for different classes of work, and, generally, in the construction and arrangement, as herein set out, whereby the objects of my invention are attained.

In the accompanying drawings, in which like letters of reference indicate like parts, Figure 1 is a side view of one of the central plates. Fig. 2 is an edge view of the same. Fig. 3 is a side view of one of the blades or teeth. Fig. 4 is an edge view, and Fig. 5 an end view, of the same. Fig. 6 is a side view of the spool or interposed ring. Figs. 7 and 8 are perspective views of one of the plates having the teeth or blades secured thereto, the same being shown in the first of these figures as attached at one side only of the plate and in the other as attached at both sides; and Fig. 9 is a plan view on a small scale of a complete harrow or stirrer, as I prefer to hang or arrange the parts for ordinary harrowing.

In detail, $a$ indicates the plate; $b$, the teeth or blades; $c$, a shaft or axle; $d$, a spool or sleeve; $e$, the frame, and $f$ ribs on the plate $a$.

The plate $a$ is of metal, preferably of cast-iron, and is provided with ribs $f$, between which the tapering ends $b'$ of the blades rest and against which they bear when in operation, thus relieving the bolts which clamp the blades to the plate from side strain. The narrowed ends of the blades rest below the spools $d$ or their flanged ends, and thus, while effectually preventing side motion, do away with bolts and greatly facilitate the attaching or removing of the blades from the plate. It will be seen, therefore, that but one or two bolts are required to fasten each blade in position, and these may be comparatively small and light, as the whole tendency of the strain on the blade while in use is against the plate, the ribs, and the spool or sleeve.

The blades are preferably made of sheet-steel, and may be stamped from the sheet and afterward bent, as shown. I bend or offset the rear edge or heel of the blades on a line extending from a point on the outer edge about an inch back from the front edge to a point on the rear edge just below the outer edge of the plate $a$, and bend the blade on this line until the heel or rear corner is about one and one-half inch away from the plane of the body of the blade.

In the use of this device for ordinary harrowing purposes the shafts upon which the blade-plates are supported are arranged at an angle, substantially as shown in Fig. 9, and the offsets or bends of the blades are in a direction away from the center—i. e., the blades used at the right of the driver are offset or bent to the right and those used on the opposite side are to the left. If, however, it is desired to use the harrow for seeding purposes, then I move the shafts until they are in line with each other. I transfer each alternate blade from a plate at the right of the center to a plate at the left and each alternate blade from the left to the right, thus forming a series of earth-working revolving blades, offset or bent at an angle, as stated, alternately to the right and left, as shown in Fig. 8. This I find gives the best result in covering grain and other like operations.

The depth of penetration of the blades in the soil may be governed by a weight to be applied to the frame.

The plates are placed upon their shafts alternately with the spools or sleeves, and a threaded nut upon the shaft at the outer end forces and holds the sleeves and plates snugly together.

The frame portions $j$ are attached to the shafts by means of two collars, one at each side, passing around two of the sleeves and pivotally united to the frame ends. This permits of the variation of the angle of the shafts, the adjustment being accomplished through the central portion of the frame. It will be seen that if narrow recesses be made in either the plate or blade and corresponding projections be made on the opposite part the surfaces thus placed in contact will take the principal strain, and that small bolts may be employed, as first stated, and that such modifications will not be a departure from one feature of my invention.

In operation the sharpened straight front cutting-edge first enters the soil and the inclined portion follows, the incline operating to lift, stir, scatter, and shift the soil in its path, operating, I find, very much more effectively than if it were a plain disk, or if the bent-up or angular corner were omitted, the sharp angular turn or bend in the blade causing the soil to be broken, crumbled, and turned, whereas if the blades were bent on a curve the operation would not be so effective. If, for instance, the soil be closely compacted, a curved face on the blade would operate upon it gradually and simply cause the soil to be turned over, while with my device the soil is brought in sudden contact with the offset portion, which is turned from the plane of revolution on a straight line, and the result is that the soil is broken and scattered, as well as turned, thus rendering the operation more effective. It will be seen, however, that blades of other shape may be used with my blade-holding plate to good advantage, and that my improved blades may be otherwise attached without departing from my invention, and that my improved blades and the central plate may be made integral, if desired.

I am aware of the construction of spade-wheel plow shown on United States Patent No. 307,809, and of the construction of rotary plow shown in No. 229,200, and of the construction of cultivator shown in No. 131,160, and of the construction of seeding-machine shown in No. 33,072, and make no claim to the constructions therein shown. The advantages of my device over those is seen in the fact that the blades therein shown are curved gradually or wholly stand at an angle to the plane of rotation, while with mine the forward portions of the blades enter the ground in the plane of rotation and the following offset portions of the blades are turned on a straight line from the plane of rotation, thereby producing the results before narrated, and, further, in none of those devices are the blades held in position in the manner employed by me, whereby they may be altered, held, and arranged as before pointed out.

Having therefore described my invention, what I claim, and desire to secure by Letters Patent, is—

1. A revolving stirrer or device for harrows, consisting of a central plate, $a$, in combination with radial blades $b$, projecting therefrom, the leading edges of which blades are radial and the following edges bent or offset from the plane of rotation, said offset being on a straight line, substantially as shown.

2. A revolving-blade device for harrows, consisting of a central plate, $a$, having exterior ribs, as $f$, and having blades $b$ attached to said plate between said ribs and projecting radially therefrom, substantially as shown.

3. In a revolving harrow, the combination of a shaft, blade-holding plates $a$, sleeves $d$, and removable blades $b$, whose inner ends project below and are held in place by the sleeve ends, substantially as and for the purposes stated.

4. In a harrow or cultivator, a revolving harrow or tooth plate with tooth-supporting ribs upon each side, in combination with removable blades whose inner ends fit between said ribs, substantially as shown.

5. A blade for revolving harrows, having the rear portion of its earth-working part offset or bent at an angle on a straight line extending from the outer edge from a point a short distance back from the leading edge and extending upward and rearward, substantially as shown.

6. The revolving stirrer or device described, consisting of a hub or central portion, $a$, and plate-metal arms secured alternately to the opposite sides of said central portion and extending radially therefrom, the following corners of which arms are bent alternately in opposite directions, substantially as described.

7. In a revolving harrow, the combination of a shaft, $c$, a series of single plates, $a$, sleeves $d$, disposed between said plates, and removable blades whose inner ends rest between the ends of the sleeves and plates, substantially as shown.

EDWIN F. SHERMAN.

Witnesses:
 ALLEN WEBSTER,
 FRANK W. LEE.